United States Patent
Morita et al.

(10) Patent No.: US 9,678,615 B2
(45) Date of Patent: Jun. 13, 2017

(54) INFORMATION PROCESSING APPARATUS

(75) Inventors: Toru Morita, Tokyo (JP); Tomonori Shimomura, Kanagawa (JP); Takashi Hatakeda, Tokyo (JP); Munetaka Tsuda, Kyoto (JP)

(73) Assignees: SONY CORPORATION, Tokyo (JP); SONY INTERACTIVE ENTERTAINMENT INC., Tokyo (JP)

( * ) Notice: Subject to any disclaimer, the term of this patent is extended or adjusted under 35 U.S.C. 154(b) by 724 days.

(21) Appl. No.: 13/810,780

(22) PCT Filed: Jun. 30, 2011

(86) PCT No.: PCT/JP2011/065073
§ 371 (c)(1),
(2), (4) Date: Jan. 17, 2013

(87) PCT Pub. No.: WO2012/014624
PCT Pub. Date: Feb. 2, 2012

(65) Prior Publication Data
US 2013/0123023 A1  May 16, 2013

(30) Foreign Application Priority Data

Jul. 28, 2010 (JP) .................. 2010-168979

(51) Int. Cl.
G06F 3/048      (2013.01)
G06F 3/0488     (2013.01)
G06F 9/44       (2006.01)

(52) U.S. Cl.
CPC .......... G06F 3/048 (2013.01); G06F 3/04883 (2013.01); G06F 9/4443 (2013.01)

(58) Field of Classification Search
CPC .......... A63F 2300/308; A63F 2300/209; A63F 2300/30; A63F 2300/203;
(Continued)

(56) References Cited

U.S. PATENT DOCUMENTS 5,386,360 A * 1/1995 Wilson et al. .................. 700/17
5,601,432 A * 2/1997 Bergman ...................... 434/118
(Continued)

FOREIGN PATENT DOCUMENTS

CN      101256463       9/2008
JP      11-161405       6/1999
(Continued)

OTHER PUBLICATIONS

Machine translation of JP H11-161405 A, downloaded from http://www4.ipdl.inpit.go.jp, Apr. 4, 2013.*
(Continued)

*Primary Examiner* — David L Lewis
*Assistant Examiner* — Matthew D. Hoel
(74) *Attorney, Agent, or Firm* — Katten Muchin Rosenman LLP

(57) ABSTRACT

Provided is an information processing apparatus capable of, even during a period in which an application program is not executed, presenting, to a user, information on an execution content of the application program. The information processing apparatus acquires display element information output by the application program during an execution of the application program, stores the display element information in a storage unit, generates an image including a display element represented by the display element information stored in the storage unit as a program-related image presenting information relating to the application program, and controls a display unit to display the generated image during the period in which the application program is not executed.

8 Claims, 6 Drawing Sheets

(58) Field of Classification Search
CPC ........ A63F 2009/2457; A63F 2009/246; A63F 2009/241; G06F 3/048; G06F 3/04883; G06F 9/4443
USPC .................................. 463/30, 31, 24, 37, 43
See application file for complete search history.

(56) References Cited

U.S. PATENT DOCUMENTS

| | | | | |
|---|---|---|---|---|
| 5,602,728 | A * | 2/1997 | Madden et al. ................ | 700/16 |
| 5,842,177 | A * | 11/1998 | Haynes ................ | G06Q 10/109 |
| | | | | 705/7.24 |
| 5,855,006 | A * | 12/1998 | Huemoeller ......... | G06Q 10/109 |
| | | | | 705/5 |
| 5,860,067 | A * | 1/1999 | Onda .................... | G06F 3/0334 |
| | | | | 705/7.18 |
| 5,895,451 | A * | 4/1999 | Yamade ............... | G06Q 10/109 |
| | | | | 705/7.18 |
| 5,898,431 | A * | 4/1999 | Webster ........... | G06F 17/30719 |
| | | | | 707/E17.094 |
| 5,899,979 | A * | 5/1999 | Miller ................ | G06Q 10/1097 |
| | | | | 705/7.21 |
| 5,910,802 | A * | 6/1999 | Shields et al. ................ | 715/808 |
| 5,936,625 | A * | 8/1999 | Kahl .................... | G06Q 10/109 |
| | | | | 715/775 |
| 5,943,051 | A * | 8/1999 | Onda .................... | G06F 3/0334 |
| | | | | 345/661 |
| 5,970,466 | A * | 10/1999 | Detjen ............. | G06Q 10/06314 |
| | | | | 705/2 |
| 6,018,343 | A * | 1/2000 | Wang .................... | G06F 9/4443 |
| | | | | 715/733 |
| 6,034,683 | A * | 3/2000 | Mansour ............... | G06Q 10/06 |
| | | | | 715/764 |
| 6,369,840 | B1 * | 4/2002 | Barnett ........... | G06Q 10/06314 |
| | | | | 715/751 |
| 7,003,735 | B2 * | 2/2006 | Edlund et al. ................ | 715/810 |
| 7,805,676 | B2 * | 9/2010 | Schemers ............ | G06Q 10/109 |
| | | | | 715/711 |
| 7,904,818 | B2 * | 3/2011 | Lauridsen ......... | G06F 17/30873 |
| | | | | 709/224 |
| 2002/0122076 | A1 | 9/2002 | Nakaki | |
| 2004/0061714 | A1 * | 4/2004 | Sinclair et al. ............... | 345/705 |
| 2009/0113444 | A1 | 4/2009 | Hackborn et al. | |
| 2009/0295788 | A1 * | 12/2009 | Duncan et al. ............... | 345/418 |
| 2011/0181603 | A1 * | 7/2011 | Liang et al. .................. | 345/473 |

FOREIGN PATENT DOCUMENTS

| | | |
|---|---|---|
| JP | 2002-259010 | 9/2002 |
| JP | 2005-322135 | 11/2005 |

OTHER PUBLICATIONS

Machine translation of JP 2005-322135 A, downloaded from http://www4.ipdl.inpit.go.jp, Apr. 4, 2013.*
Machine translation of JP 2002-259010 A, downloaded from http://www4.ipdl.inpit.go.jp, Apr. 4, 2013.*
International Search Report dated Oct. 4, 2011, from the corresponding PCT/JP2011/065073.
Notification of Reasons for Refusal dated Feb. 4, 2014, from corresponding Japanese Application No. 2010-168979.
International Preliminary Report on Patentability and Written Opinion of the International Searching Authority dated Mar. 21, 2013, from corresponding International Application No. PCT/JP2011/065073.
European Search Report dated Nov. 10, 2014 from corresponding Application No. 11812217.5.
Chinese Office Action dated Jan. 6, 2015 from corresponding Application No. 201180036992.8.

* cited by examiner

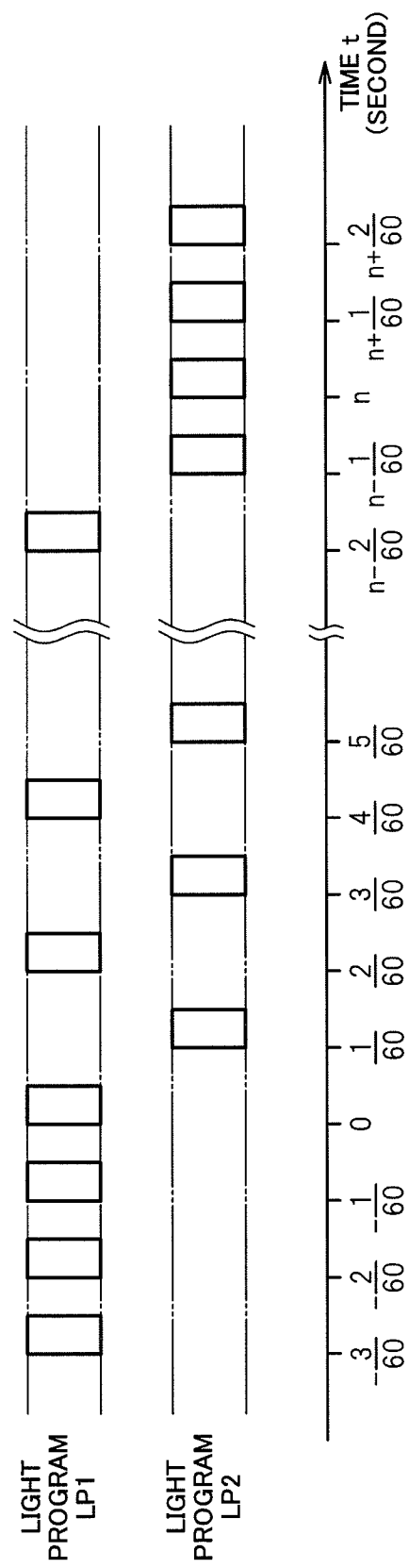

INFORMATION PROCESSING APPARATUS

TECHNICAL FIELD

The present invention relates to an information processing apparatus, an information processing method, and an information storage medium for displaying information relating to an application program on a screen.

BACKGROUND ART

When a computer executes an application program such as a game program, the computer displays a processing result of the program on a screen.

SUMMARY OF INVENTION

Technical Problem

One of objects of the present invention is to provide an information processing apparatus, an information processing method, and an information storage medium capable of presenting, to a user, information on an execution content of an application program even during a period in which the application program is not executed.

Solution to Problem

According to the present invention, there is provided an information processing apparatus, including: display element information acquisition means for acquiring display element information output by the application program during an execution of an application program, and storing the display element information in a storage unit; and program-related image display control means for generating an image including a display element represented by the display element information stored in the storage unit as a program-related image for presenting information relating to the application program, and controlling a display unit to display the generated image during a period in which the application program is not executed.

In the above-mentioned information processing apparatus, the display element information acquisition means may acquire, along with the display element information, information indicating a display time of the display element information output by the application program, and the program-related image display control means may control a display timing of the display element represented by the display element information by using the information indicating the display time.

Further, the application program may be a program for executing predetermined processing at a predetermined processing execution time, and the display element information acquisition means may acquire, along with the display element information relating to the predetermined processing, information indicating a display time determined depending on the predetermined processing execution time.

Further, in the information processing apparatus, the information indicating the display time may include information indicating a display start time for the display element, and the program-related image display control means may restrict the display of the program-related image including the display element when the display timing of the program-related image is before the display start time, and display the program-related image including the display element when the display timing is after the display start time.

Further, in the information processing apparatus, the information indicating the display time may include information indicating a display end time for the display element, and the program-related image display control means may display the program-related image including the display element when the display timing of the program-related image is before the display end time, and restrict the display of the program-related image including the display element when the display timing is after the display end time.

Further, in the information processing apparatus, the display element information acquisition means may delete the display element information stored in the storage unit in response to an instruction by the application program.

Further, in the information processing apparatus, the display element information acquisition means may update the display element information stored in the storage unit to display element information newly output by the application program in response to an instruction by the application program.

Further, the application program may be an application program of a first type, the information processing apparatus may further include menu image display control means for controlling the display unit to display a menu image including both a menu item image associated with the application program of the first type and a menu item image associated with an application program of a second type which is different from the first type, the program-related image display control means may generate a program-related image for presenting information relating to the application program of the first type when a user selects the menu item image associated with the application program of the first type in a state in which the menu image is displayed, and the information processing apparatus may further include application execution means for activating the application program of the second type and starting display of an image output by the application program of the second type when the user selects the menu item image associated with the application program of the second type in a state in which the menu image is displayed, and activating the application program of the first type corresponding to the program-related image and starting display of an image output by the application program of the first type when the user carries out a predetermined activation instruction operation in a state in which the program-related image is displayed.

According to the present invention, there is also provided an information processing method, including the steps of: acquiring display element information output by the application program during an execution of an application program, and storing the display element information in the storage unit; and displaying an image including a display element represented by the display element information stored in the storage unit as a program-related image for presenting information relating to the application program during a period in which the application program is not executed.

According to the present invention, there is further provided a computer readable information storage medium having recorded thereon a program for causing a computer to function as: display element information acquisition means for acquiring display element information output by the application program during an execution of an application program, and storing the display element information in a storage unit; and program-related image display control means for generating an image including a display element represented by the display element information stored in the storage unit as a program-related image for presenting information relating to the application program, and controlling a display unit to display the generated image during a period in which the application program is not executed.

BRIEF DESCRIPTION OF DRAWINGS

FIG. 10 A diagram illustrating a timing for rendering a program output image.

DESCRIPTION OF EMBODIMENTS

An embodiment of the present invention is described below in detail with reference to the accompanying drawings.

Figure 1:
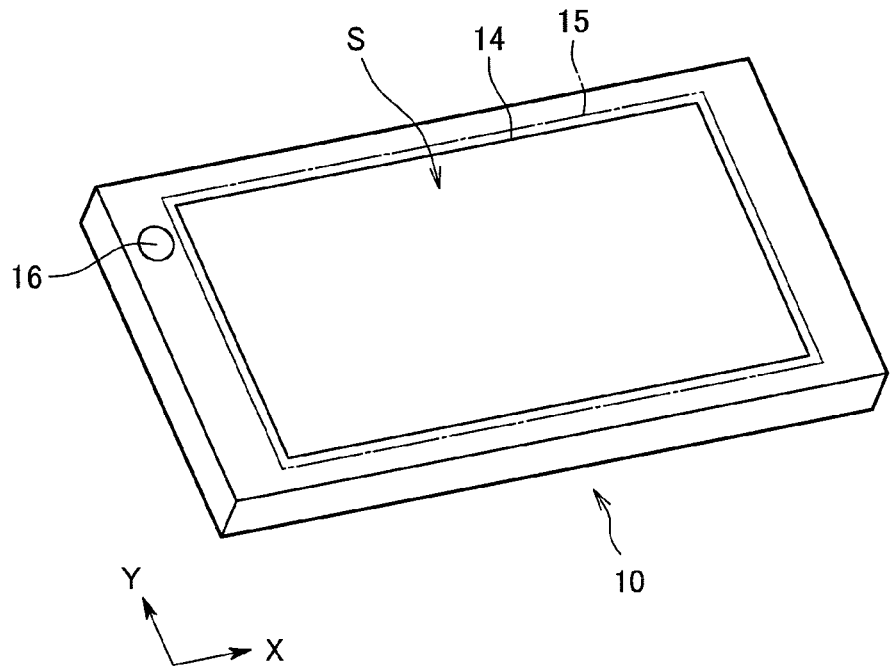
FIG. 1 A perspective view illustrating an example of an appearance of an information processing apparatus according to an embodiment of the present invention.
Figure 2:
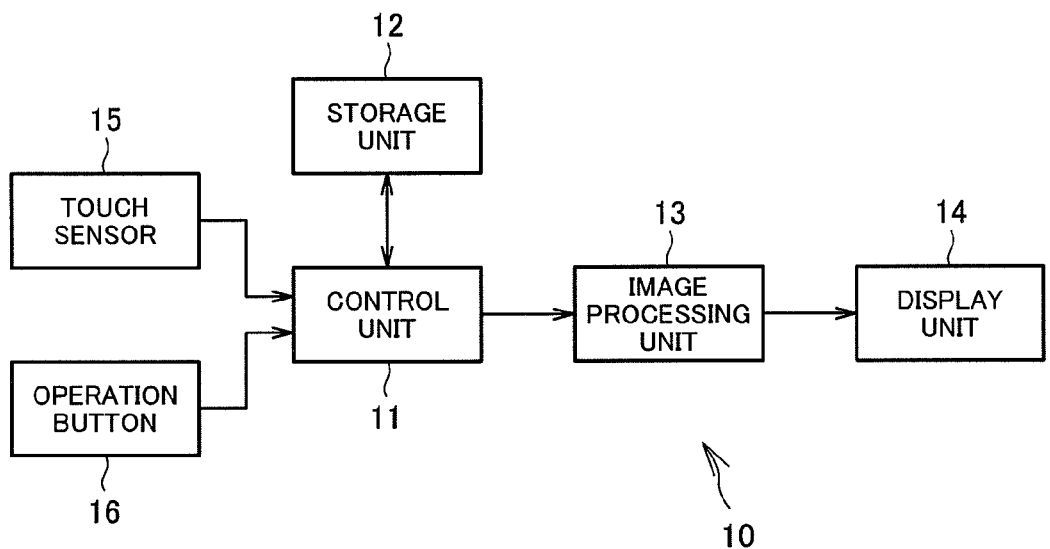
FIG. 2 A configuration block diagram illustrating a configuration of the information processing apparatus according to the embodiment of the present invention.

FIG. 1 is a perspective view illustrating an example of an appearance of an information processing apparatus 10 according to an embodiment of the present invention. Further, FIG. 2 is a configuration block diagram illustrating a configuration of the information processing apparatus 10. As illustrated in the figures, the information processing apparatus 10 includes a control unit 11, a storage unit 12, an image processing unit 13, a display unit 14, a touch sensor 15, and an operation button 16.

The control unit 11 is, for example, a CPU or the like and executes various kinds of information processing in accordance with programs stored in the storage unit 12. A specific example of processing executed by the control unit 11 in this embodiment is described later.

The storage unit 12 is, for example, a memory element such as a random access memory (RAM) or a read-only memory (ROM), a disk device, or the like and stores the programs executed by the control unit 11 and various kinds of data. Further, the storage unit 12 also functions as a work memory for the control unit 11. Especially in this embodiment, the information processing apparatus 10 is intended to execute a plurality of application programs AP such as a game application, and the storage unit 12 stores the application programs AP.

The image processing unit 13 includes, for example, a GPU and a frame buffer memory, and renders an image to be displayed on a screen S of the display unit 14 in accordance with a rendering instruction output by the control unit 11. As a specific example, the image processing unit 13 includes a frame buffer memory corresponding to the screen S, and the GPU writes the image to the frame buffer memory every predetermined time in accordance with the instruction from the control unit 11. Then, the image written to the frame buffer memory is converted into a video signal at a predetermined timing, and displayed on the screen S.

The display unit 14 may be a variety of devices for displaying an image, such as a liquid crystal display panel and an organic electroluminescence (EL) display panel. The display unit 14 includes the screen S having a substantially rectangular shape as illustrated in FIG. 1. In the following, the horizontal direction of the screen S (that is, the direction along the upper side and the lower side of the screen S) is referred to as an X-axis direction, and the direction toward the right side is referred to as a positive X-axis direction. Further, the vertical direction of the screen S (that is, the direction along the right side and the left side of the screen S) is referred to as a Y-axis direction, and the direction toward the upper side is referred to as a positive Y-axis direction.

The touch sensor 15 includes a substantially rectangular detection surface having a shape and size corresponding to the screen S and detects, when an object contacts on the detection surface, the contact position of the object. The detection surface of the touch sensor 15 is provided so as to overlap the screen S. Note that, in the following, for convenience of description, a user brings his/her finger into contact with the touch sensor 15 to input an operation. However, the present invention is not limited thereto, and the user may bring an object such as a stylus held in his/her hand into contact with the detection surface. Further, it is not necessary that the touch sensor 15 detect the position of the object only when the object contacts the detection surface, but the touch sensor 15 may detect the position of the object with respect to the detection surface when the object approaches to a detectable range on the detection surface. The touch sensor 15 may be of any type, as long as it is a device capable of detecting the position of the object on the detection surface, for example, of a capacitive type, a pressure type, an optical type, or the like.

The operation button 16 is a type of operation members used by the user in conjunction with the touch sensor 15 to input an operation to the information processing apparatus 10. The user pushes the operation button 16 to input the operation to the information processing apparatus 10. Note that, in FIG. 1, only one operation button 16 is illustrated, but the information processing apparatus 10 may include a plurality of operation buttons. The information processing apparatus 10 may further include a switch, an analog stick, or other such operation member.

In this embodiment, in order to receive an instruction operation from the user, the control unit 11 displays various images such as a menu image and images relating to the application programs AP on the screen S. Then, the control unit 11 executes various types of information processing using the detection result of the touch sensor 15 obtained in the state in which the images are displayed. Specifically, the control unit 11 uses the result of detecting the position of the finger of the user by the touch sensor 15 to judge details of the operation input by the user. Then, the control unit 11 executes the processing corresponding to the details of the judged operation input, and displays the processing result on the screen S to present the processing result to the user.

Next, the application programs AP stored in the storage unit 12 to be executed by the information processing apparatus 10 are described. Note that, in the following, an application program AP is a program to be activated in response to an operation performed by the user in a state in which a menu image Im or a board image Ib to be described later is displayed. The information processing apparatus 10 may execute various programs in addition to the application programs AP.

In this embodiment, the application programs AP are classified into the following two types: the first type of the application programs AP are full mode programs FP that are operated only in a full mode; and the second type of the application programs AP are light programs LP that may be operated in a mode other than the full mode. In this case, the full mode refers to a mode in which one program occupies the entire screen S for operation. The full mode programs FP are operated in the state of the full mode during its execution, and display the processing result on the entire screen S. In contrast, the light programs LP display their processing results in the board image Ib to be described later.

Figure 3:
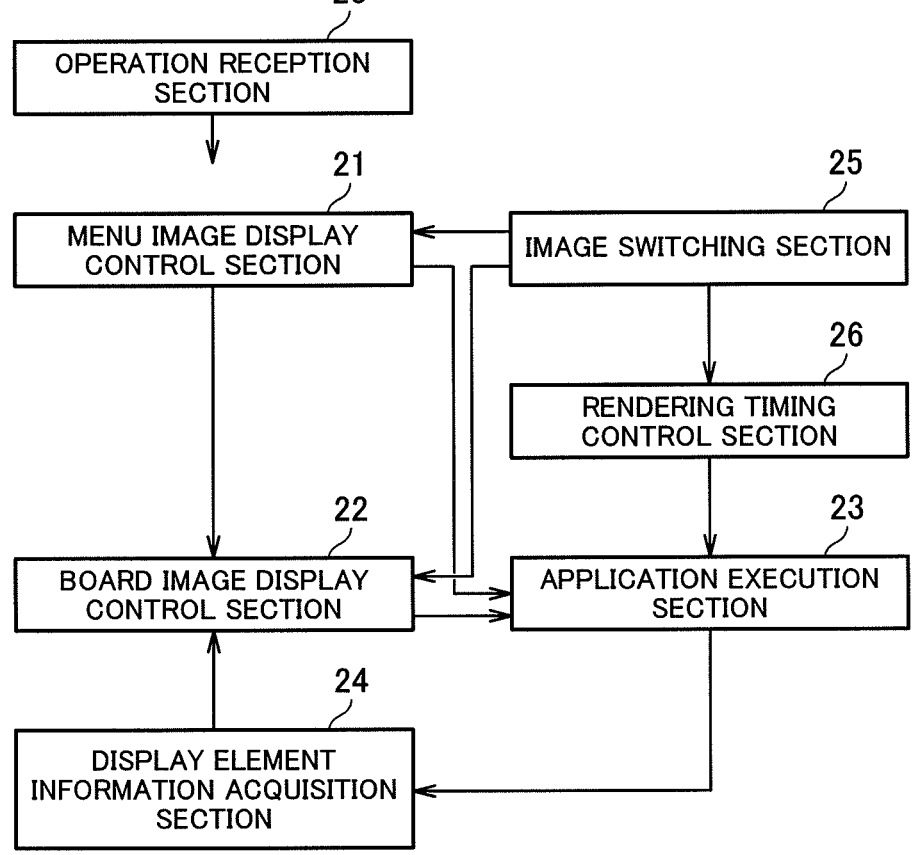
FIG. 3 A functional block diagram illustrating functions realized by the information processing apparatus according to the embodiment of the present invention.

A description is now given of functions realized by the information processing apparatus 10 according to the embodiment. FIG. 3 is a functional block diagram illustrating the functions realized by the information processing apparatus 10. As illustrated in this figure, the information processing apparatus 10 functionally includes an operation reception section 20, a menu image display control section 21, a board image display control section 22, an application execution section 23, a display element information acquisition section 24, an image switching section 25, and a rendering timing control section 26. These functions are realized by the control unit 11 executing a program stored in the storage unit 12. This program may be provided to the information processing apparatus 10 while being stored in various computer-readable information storage media such as an optical disc. Moreover, the program may be provided to the information processing apparatus 10 via a communication network such as the Internet.

The operation reception section 20 receives the instruction operation performed by the user on the touch sensor 15 or the operation button 16. Especially in this embodiment, for example, the user brings his/her finger on the detection surface of the touch sensor 15 or slides the finger in a state in which the finger is in contact with the detection surface, to thereby input the operation to the information processing apparatus 10. Specifically, in the following, an operation in which the user brings his/her finger in contact with one point on the detection surface for a short period of time is referred to as a tap operation. When the tap operation is performed, the operation reception section 20 outputs a position of the tap operation (that is, the position in the detection surface with which the user brings his/her finger into contact). Further, an operation in which the user brings his/her finger into contact with one point on the detection surface and moves the finger linearly with the position as a start point in any direction on the detection surface before releasing the finger is referred to as a slide operation. When the slide operation is performed, the information processing apparatus 10 performs various kinds of information processing in accordance with the direction in which the user moved the finger in the operation. In other words, the slide operation is an operation for specifying, by the user, a direction on the information processing apparatus 10. When the slide operation is performed in the state in which the menu image Im or the board image Ib to be described later is displayed, the operation reception section 20 determines the direction specified by the user from the positions of the start point and the end point. In this case, the specified direction may be, for example, any one of four directions in the screen S: up; down; left; and right. The function sections to be described below execute various types of information processing in accordance with the details of the tap operation and the slide operation received by the operation reception section 20.

The menu image display control section 21 controls to display the menu image Im on the screen S at a predetermined timing, for example, at the time of activation of the information processing apparatus 10, or at the time when the user gives an instruction to display a menu. The menu image Im is an image to be presented to prompt the user to select an application program AP, the image including a plurality of menu item images Ic as targets for selection by the user. Each menu item image Ic is associated with any of the application programs AP stored in the storage unit 12, and is stored in the storage unit 12. Note that, each menu item image Ic may be an icon image representing a corresponding application program AP, or the like. On this occasion, as described above, according to this embodiment, the application programs AP include two types of programs: the full mode programs FP and the light mode programs LP, and the menu image Im includes both menu item images Ic associated with the full mode programs FP, and menu item images Ic associated with the light programs LP.

Figure 4:
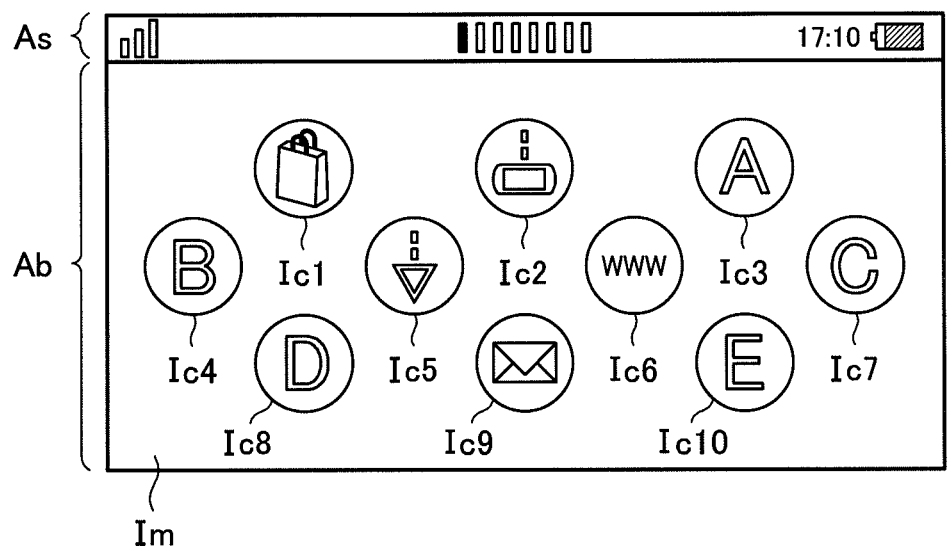
FIG. 4 A diagram illustrating an example of a screen for displaying a menu image.

FIG. 4 is a diagram illustrating an example of the screen S displaying the menu image Im. In this figure, the menu image Im includes 10 menu item images Ic1 to Ic10, respectively associated with the application programs AP. Further, in FIG. 4, a long rectangular status bar display region As is provided along the upper side of the screen S, and a status bar indicating information such as a current time and a remaining battery of the information processing apparatus 10 is displayed in the status bar display region As. Further, a region in the screen S that displays the menu image Im is referred to as a board display region Ab. In the example of FIG. 4, the board display region Ab is illustrated as a region of the screen S other than the status bar display region As. However, in a case where the status bar does not need to be displayed at all times, the board display region Ab may be the entire screen S.

In a state in which the menu image Im is displayed, the user taps a position at which any one of the menu item images Ic is displayed to perform a selection operation on the menu. In other words, the user taps any one of the menu item images Ic to select the application program AP associated with the menu item image Ic subjected to the tap operation. Specifically, when a tap operation is received from the user, the menu image display control section 21 identifies the menu item image Ic displayed at the position in the screen S tapped by the user. Then, the menu image display control section 21 determines the type of the application program AP associated with the menu item image Ic. In other words, the menu display control section 21 determines whether the application program AP is a full mode program FP or a light program LP. When the menu display control section 21 determines that the application program AP selected by the user is a light program LP, the menu image display control section 21 immediately instructs the application execution section 23 to activate the light program LP. On the other hand, when the selected application program AP is a full mode program FP, the menu image display control section 21 instructs the board image display control section 22 to generate an image (hereinafter referred to as program-related image Ip) for presenting information relating to the selected full mode program FP.

When the user selects any one of the application programs AP in a state in which the menu image Im is displayed on the screen S, the board image display control section 22 carries out control of displaying an image relating to the selected application program AP on the screen S. In the following, an image corresponding to the application program AP displayed by the board image display control section 22 is referred to as a board image Ib. According to this embodiment, the board image Ib is displayed in the board display region Ab of the screen S which is the same as that of the screen S controlled by the menu image display control section 21 to display the menu image Im.

Specifically, when the user selects a full mode program FP, the board image display control section 22 generates a program-related image Ip corresponding to the full mode program FP, and displays the program-related image Ip as the board image Ib in the board display region Ab. Moreover, when the user selects a light program LP, the board image display control section 22 displays, as a board image Ib, an image rendered by an application execution section 23 to be described later executing the selected light program LP. In the following, an image which is output by image rendering processing by an application program AP and represents a processing result of the application program AP is referred to as a program output image Io.

A detailed description is now given of the program-related image Ip generated when the user selects a full mode program FP. According to this embodiment, the program-related image Ip is an image representing a part or an entirety of a virtual region (hereinafter referred to as program board B) on which a plurality of display elements relating to the corresponding application program are arranged. Information on display elements arranged on the program board B is acquired by the display element information acquisition section 24 to be described later.

The program board B may be a region of a size that fits in the board display region Ab. However, in the following, the program board B is a rectangular region extending along a predetermined scroll direction (in this case, Y-axis direction), and sides thereof extending along the Y-axis direction are longer than a side of the board display region Ab in the same direction. Therefore, the board image display control section 22 cannot display the entire program board B in the board display region Ab at once, but displays only a partial range of the program board B as the program-related image Ip in the board display region Ab. In this case, the range of the program board B that is actually displayed on the screen S (display target range) moves in accordance with a scroll instruction by the user. Specifically, by the user carrying out a slide operation along a scroll direction of the touch sensor 15, the board image display control section 22 moves display target range in the program board B. Then, the board image control section 22 displays a portion of the program board B contained in the display target range after the movement, as a program-related image Ip in the board display region Ab. Note that, a size and a shape of the display target range correspond to the size and the shape of the board display region Ab. Moreover, when the board image display control section 22 displays the board image Ib for the first time, a predetermined position such as the uppermost end of the program board B may be contained in the display target range.

Figure 5:
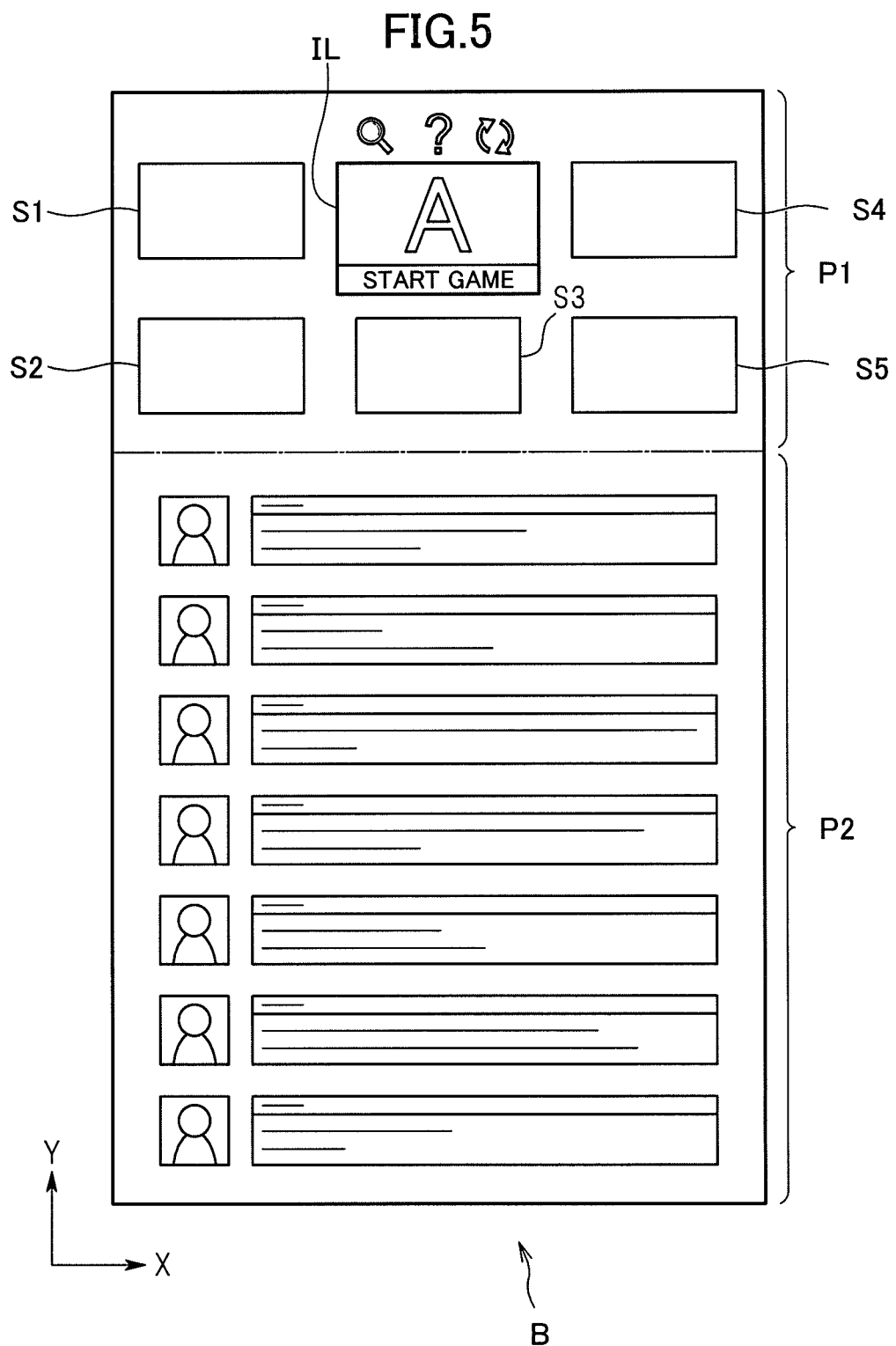
FIG. 5 A diagram illustrating an example of a program board.

FIG. 5 is a diagram illustrating an example of the program board B corresponding to the full mode program FP. As exemplified in this figure, according to this embodiment, the program board B is constituted by two subregions: a program information region P1 and a communication region P2. The program information region P1 is a region in which information prepared by a provider of the full mode program FP and the like are presented, and the communication region P2 is a region for presenting contents of messages posted by a plurality of users with respect to the full mode program FP. The communication region P2 is used for information exchange among users or the like.

Figure 6:
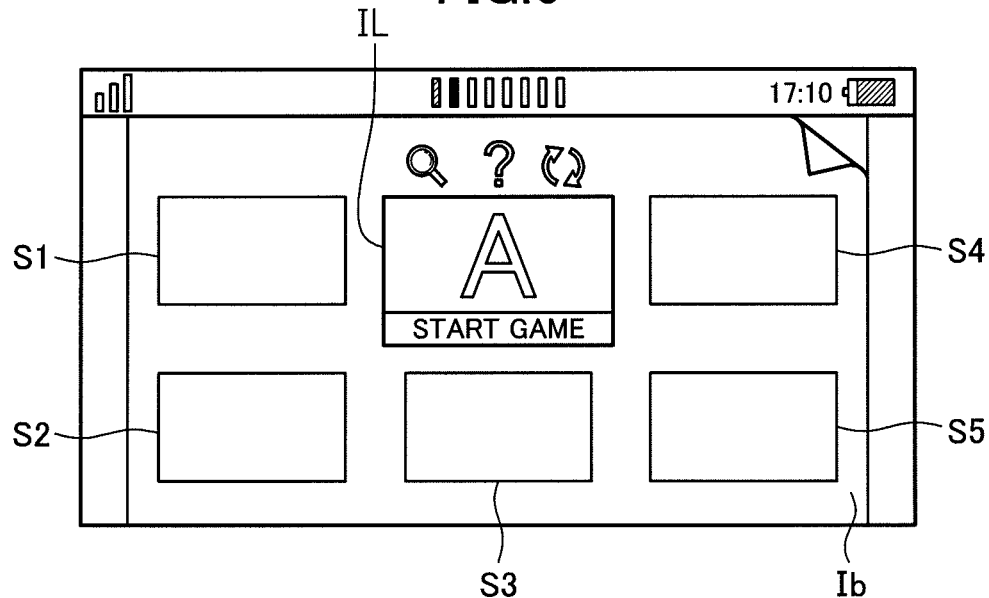
FIG. 6 A diagram illustrating an example of a screen for displaying a program-related image.
Figure 7:
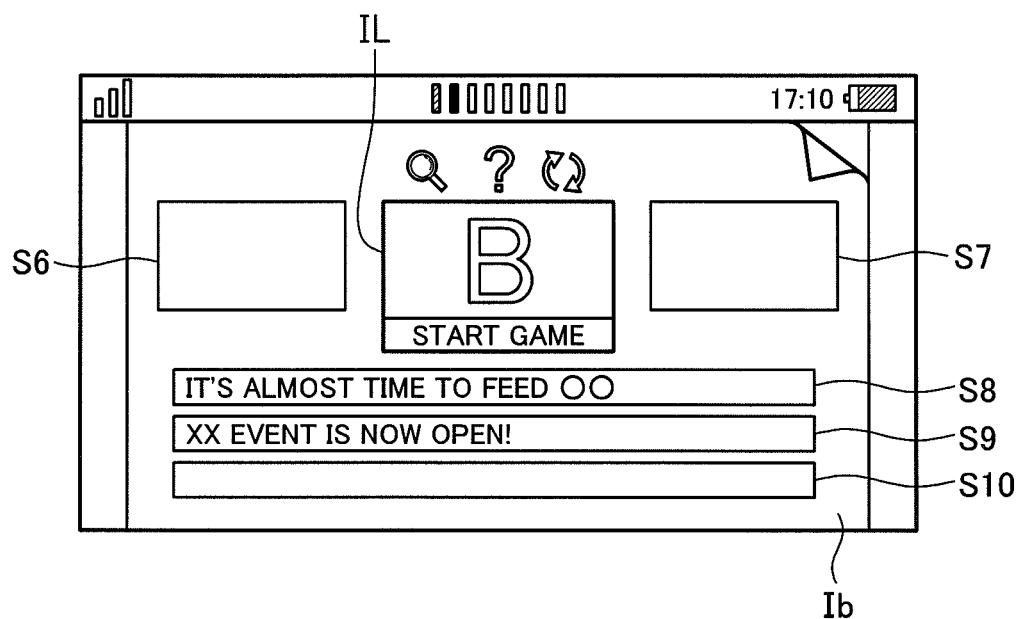
FIG. 7 A diagram illustrating another example of the screen for displaying the program-related image.

FIG. 6 is a diagram illustrating an example of a screen S on which, as the board image Ib, a program-related image Ip is displayed, and illustrates an example of the program-related image Ip when the program information region P1 of the program board B illustrated in FIG. 7 is contained in the display target range. In the example in this figure, the program-related image Ip is generated by superimposing, on a predetermined background image, display elements in the program board B. The background image may be an image specific to each of the full mode programs FP.

The program information region P1 includes an image for activation which is subject to an operation when the user activates a full mode program FP corresponding to the program board B. Specifically, according to this embodiment, as the image for activation, an activation button image IL is arranged in the program information region P1. The user instructs the activation of the full mode program FP by tapping a display position of the activation button image IL in a state in which the program-related image Ip including the activation button image IL is displayed in the screen S. In this embodiment, it is assumed that the activation button image IL is prepared in advance for each of the full mode programs FP. However, there can be a full mode program for which the image for activation is not prepared. In this case, the board image display control section 22 may use, as the image for activation, in place of the dedicated activation button image IL, a menu item image Ic corresponding to the full mode program FP which is displayed in the menu image Im. Alternatively, the board image display control section 22 may receive, in place of the tap operation by the user on the image for activation, other predetermined operations (such as an operation of depressing a predetermined button and an operation of tapping a predetermined location on the touch sensor 15) as the activation instruction operations by the user.

When receiving the activation instruction operation by the user in the state in which the program-related image Ip corresponding to the full mode program FP is displayed, the application execution section 23 activates the full mode program FP in the full mode. As a result, an image of a processing result generated by the program is displayed on the entire screen S. In the state in which the processing result by the full mode program FP is displayed on the screen S, a content of an operation carried out by the user on the touch sensor 15 is processed by the full mode program FP. Moreover, when the user instructs an end of the full mode by an operation such as depression of the operation button 16 in this state, the board image display control section 22 finishes the display of the image in the full mode, and displays again the program related image Ip corresponding to the full mode program FP which has been executed up to that time. On this occasion, the application execution section 23 does not necessarily terminate the full mode program FP which has been executed up to that time to free a memory, and may display the program-related image Ip in a state in which the execution of the program is temporarily suspended. With this configuration, the user may instruct the re-execution of the full mode program FP by a method such as tapping again the activation button image IL, and accordingly the application execution section 23 can resume the execution of the program which is temporarily suspended.

As described above, in a case where the menu item image Ic corresponding to the full mode program FP is selected, the information processing apparatus 10 can present various types of information on the program to the user by displaying the program-related image Ip including the activation button image IL first instead of activating the corresponding program immediately. Further, as described below, in the state in which the board image Ib is displayed, the user may perform an image switching operation to give an instruction to switch the board images Ib that has been displayed. However, there may be a case where the program operating in the full mode receives such operation corresponding to the image switching operation as another operation relating to the processing of the program. Therefore, the information processing apparatus 10 displays, in the case where the user selects the menu item image Ic corresponding to the full mode program FP, the program-related image Ip first, to thereby also include the full mode program FP, which occupies the entire screen during execution of the processing, as an image in the images as the targets for switching by the image switching operation.

On the other hand, when the application program AP selected by the user in the state in which the menu image Im is displayed is not a full mode program FP but a light program LP, a program output image Io indicating a processing result of the program is generated by the application execution section 23 executing the light program LP as described above. The board image display control section 22 displays the program output image Io as a board image Ib in the board display region Ab. The program output image Io may also be a subject of the image switching operation by the image switching section 25 to be described later. According to this embodiment, in the menu image Im, menu item images Ic corresponding to full mode programs FP and menu item images Ic corresponding to light programs LP exist in the mixed state as described above. Therefore, the user can select both the full mode program FP for which a corresponding program-related image Ip should be displayed once before the activation thereof and the light program LP for which the activation should be started immediately, by the operation common thereto in the state in which the menu image Im is displayed. Moreover, the user can switch for display the program-related image Ip corresponding to the full mode program FP and the program output image Io output by the light program LP by a predetermined operation, without realizing the difference between the types of the programs rendering those images.

The application execution section 23 starts the execution of the application program AP in accordance with the activation instruction from the menu image display control section 21 and the board image display control section 22, and starts the rendering processing for a program output image Io indicating the processing result of the program. Specifically, when the user selects a light program LP in a state in which the menu image Im is displayed, the application execution section 23 activates the light program LP. The program output image Io rendered by the light program LP is displayed in the board display region Ab in the screen S as a board image Ib as described above. Moreover, when the user selects the activation button image IL in the program-related image Ip in a state in which the program-related image Ip is displayed, the application execution section 23 activates a full mode program FP corresponding to the program-related image Ip. The full mode program FP operates only in the full mode, and hence a program output image Io indicating the processing result thereof is displayed on the entire screen S.

The display element information acquisition section 24 manages information on display elements arranged in a program-related image Ip generated by the board image display control section 22. Specifically, the display element information acquisition section 24 acquires information (display element information) on display elements to be arranged in a program board B corresponding to each of full mode programs FP stored in the storage unit 12. Moreover, when a full mode program FP is selected in the menu image Im, and the board image display control section 22 newly generates a program-related image Ip, the display element information acquisition section 24 provides the board image display control section 22 with information on display elements to be included in the program-related image Ip. The board image display control section 22 generates the program-related image Ip by arranging the display elements indicated by the display element information provided by the display element acquisition section 24 in the program board B.

According to this embodiment, a plurality of templates for a manner of an arrangement of display elements in a program board B are prepared in advance. Each of the templates is information for defining at which position, in which size, and in which data format (such as text data or image data), a display element is to be arranged in the program board B. For example, in FIGS. 5 and 6, the activation button image IL is arranged approximately at the center of the program information region P1, and a plurality of icon images are arrange in a row above the activation button image IL. Moreover, a total of five spaces are provided for arranging display elements around the activation button image IL. Those spaces S1 to S5 are spaces for arranging display elements in an image data format.

FIG. 7 is a diagram illustrating a display example of a program-related image Ip when another template is applied to the program information region P1. In the example in this figure, an activation button image IL and icon images as well as spaces S6 and S7 for display elements in an image data format, and spaces S8 to S10 for display elements in a text data format are included in the program information region P1.

The information processing apparatus 10 stores, in association with each of the full mode programs FP, information for identifying a template which is to be used in generating a program board B corresponding to the full mode program FP in the storage unit 12. The board image display control section 22 generates a program-related image Ip by arranging display elements acquired by the display element information acquisition section 24 in the program board B based on a template identified by the stored information.

A description is now given of specific examples of display elements.

Some of display elements arranged in the program information region P1 may be static information (namely, information having contents which are not changed) provided in advance along with a full mode program FP for the information processing apparatus 10. For example, in association with each of the full mode programs FP, an image indicating a link to a web site of the provider (vendor) of the full mode program FP and a motion image such as a promotion video of the full mode program FP may be stored in the storage unit 12. The display element information acquisition section 24 acquires display element information by reading out those data items stored in the storage unit 12. Moreover, even for a display element changing with time, display element information can be provided along with the full mode program FP to the information processing apparatus 10 in advance if contents and timings of the change are determined in advance. For example, if a display element for counting down an arrival of a predetermined time and date is need to be displayed in a program-related image Ip, the display element information acquisition section 24 can select an image to be displayed based on the current time and date from the plurality of images, and can provide the board image display control section 22 with the image as a display subject by storing a plurality of images to be switched with time and information for representing the switching timings as display element information in the storage unit 12.

Moreover, the display element information acquisition section 24 may acquire display element information via a network such as the Internet. Examples of the display element information include notice information on an event relating to a full mode program FP, update information on related web sites, information on related products, and publication information on patches and additional programs for the full mode programs FP. For those information items, information on sources of acquisition (such as URLs) is associated with each of the full mode programs FP, and is stored in the storage unit 12. When the board image display control section 22 newly generates a program-related image Ip, the display element information acquisition section 24 refers to the information on sources of acquisition, and makes an access to a content delivery server prepared by a provider of the full mode programs FP or the like. Accordingly, the display element information acquisition section 24 acquires display element information provided by the content delivery server.

Moreover, the display element information acquisition section 24 also acquires display elements to be arranged in the communication region P2 via a network from the outside. Specifically, for example, the user of the information processing apparatus 10 can post a massage related to a full mode program FP via a communication network such as the Internet to a predetermined communication server. In order to realize the processing for posting, the information processing apparatus 10 stores, in association with the full mode program FP, information (such as a URL) for identifying a communication server serving as a destination for posting a message in the storage unit 12, and transmits a message input by the user to the communication server by referring to the information for identifying the communication server. When the display element information acquisition section 24 generates a program board B associated with a full mode program FP, the display element information acquisition section 24 makes an access to the communication server, and acquires message information posted before for the full mode program FP. Then, the board image display control section 22 generates an image of the communication region P2 in which display elements representing contents of the acquired messages and persons who have posted the messages are arranged as a part of the program board B.

Moreover, the display element information acquisition section 24 may acquire information output by a full mode program FP during execution as display element information. In this case, a part of functions of the display element information acquisition section 24 are realized as application programming interfaces (APIs) invoked by the full mode program FP. The full mode program FP outputs display element information by invoking an API in accordance with a processing content thereof, and stores the display element information in the storage unit 12. The display element information stored in the storage unit 12 is used when the board image display control section 22 generates a program-related image Ip corresponding to the full mode program FP. Then, the program-related image Ip is newly generated and displayed even while the corresponding full mode program FP is not executed. Therefore, if the display element information is previously output and stored in the storage unit 12 during the execution of the full mode program FP, the information processing apparatus 10 can display, even while the full mode program FP is not executed, a program-related image Ip for presenting information reflecting an execution content of the full mode program FP to the user.

A description is now given of a specific example of an output of the display element information using such APIs if a full mode program FP is a game program. For example, the full mode program FP may output texts and images based on a progress state of the game being played by the user as the display element information. More specifically, the full mode program FP may output, for a game in which the user can play in a plurality of courses or on a plurality of stages, at a timing when the user starts playing in a new course or on a new stage, a map image of the course or stage played by the user as the display element information. Moreover, at a timing when the game is finished, or the user makes a specific instruction, an appearance (avatar) of a player character currently operated by the user or an image of a machine being operated by the user may be output as display element information. As a result, information based on the playing state at each moment is included in a program-related image Ip as the play by the user progresses, and is presented to the user.

Moreover, if a full mode program FP has a function of acquiring external information via a network, the full mode program FP may output information (such as ranking information on players playing the same game) acquired by means of the function from an external server as display element information. In this case, even if system programs themselves for realizing the board image display control section 22 and the display element information acquisition section 24 do not have the function of making an access to a server of a providing source for providing the external information, the information provided by the server of the providing source can be included in a program-related image Ip and can be displayed.

Moreover, when a full mode program FP invokes an API and outputs display element information, the full mode program FP may output information indicating a display time for the display element information along with the display element information. The board image display control section 22 controls a display timing for the corresponding display element by using the information indicating the display time. In other words, the board image display control section 22 determines whether or not the corresponding display element is included in a program-related image Ip to be displayed in a certain display timing depending on a content of the information indicating the display time. For example, a full mode program FP outputs, as the information indicating the display time, information indicating a display start time and a display end time of a display element. When information on the display start time is associated with the display element information, and the display timing for a program-related image Ip is before the display start time, the board image display control section 22 restricts the display of the program-related image Ip containing the display element, and when the display timing is after the display start time, the board image display control section 22 displays the program-related image Ip containing the display element. Moreover, when information on the display end time is associated with the display element information, and the display timing is before the display end time, the board image display control section 22 displays a program-related image Ip containing the display element, and when the display timing is after the display end time, the board image display control section 22 restricts the display of the program-related image Ip containing the display element. As a result, control for displaying the display element in a certain determined period or restricting the display of the display element until a certain time arrives can be provided.

Particularly, if a full mode program FP is a program of acquiring information on a current time and date measured by the information processing apparatus 10, and carrying out processing based on the current time and date, the full mode program FP outputs information relating to the processing to be carried out at a predetermined processing execution time as display element information, and outputs information indicating a time determined corresponding to the processing execution time as information indicating a display time. As an example, a full mode program FP carries out certain processing A at a time t1, and carries out processing B at a time t2 (=t1+T), which is a predetermined period T after the time t1. In this case, at the timing when the processing A is carried out, the full mode program FP invokes an API, and outputs display element information on the processing B along with information on a display start time corresponding to the time t2 (for example, time t3 which is a predetermined period before the time t2). The display element information on the processing B may be an image or a string representing that, for example, the time for carrying out the processing B arrives soon. In this case, after the arrival of the time t3, when the board image display control section 22 displays a program-related image Ip corresponding to the full mode program FP, display elements relating to the processing B are to be included in the program-related image Ip. As a result, even if the full mode program FP is not being executed, the user can know that the timing for carrying out the processing B arrives soon.

As a more specific example, a full mode program FP is a program for a game for taking care of a pet, and a user needs to periodically carry out an operation of feeding a pet in this game. On this occasion, a timing when the user should feed the pet is determined not based on a virtual time in the game, but based on the time which actually elapses. In order to realize this control, the full mode program FP acquires information on the actual time and date, and, based on the information, determines whether or not a next operation of feeding the pet has been carried out within a predetermined period after the last time when the user fed the pet. When the user has not activated the full mode program FP within the predetermined period, and has not carried out the operation of feeding, the full mode program FP carries out processing of generating a result based thereon (causing the pet to become displeased).

In this example, when the user carries out the operation of feeding the pet while the game is being played, the full mode program FP determines a timing at which the user should feed the pet next by acquiring the information on the current time and date, and adding a predetermined period determined by a content of the game (in this case, the time interval to a next timing for feeding the pet) to the acquired current time and date. Then, the full mode program FP outputs display element information having a content of prompting the user to feed the pet along with the display start time which is a time earlier by a predetermined period than the arrival of the next feeding timing. In this way, the information processing apparatus 10 can attract attention of the user by displaying a program-related image Ip containing a display element representing the situation when the timing for carrying out the predetermined operation of feeding the pet becomes closer, even while the full mode program FP is not executed.

Moreover, even for a game in which a predetermined event occurs after a certain period has elapsed from a time at which a user satisfies a certain condition during the play of the game, a full mode program FP outputs display element information for notifying the user of the occurrence of the event along with information on a display start time determined based on an event occurrence timing, and, consequently, the information processing apparatus 10 can display a program related image Ip including a display element showing the occurrence of the event at the timing of the occurrence of the event. In the spaces S8 and S9 of FIG. 7, examples of display elements as described above are illustrated.

Moreover, the display element information acquisition section 24 may function as an API for deleting display element information stored in the storage unit 12. Moreover, the display element information acquisition section 24 may also function as an API for updating a content of a display element represented by display element information stored in the storage unit 12, and information indicating a display time associated with the display element information. For example, the timing for displaying the display element information for notifying of an operation which the user should periodically carry out as described above changes each time the user carries out the operation during the play of the game. Then, the full mode program FP invokes, each time when predetermined processing (such as feeding processing instructed by the user) is carried out, the API for updating the display element information, thereby carrying out update processing of updating the display start time of the display element information stored previously in the storage unit 12 to a time determined based on the next timing when the user should carry out the feeding. Moreover, when an event which has occurred in a game is finished, the full mode program FP may delete display element information for notifying the user of the occurrence of the event. Moreover, in a case where an appearance of a character operated by the user is output as display element information, the full mode program FP may update the display element information output before based on a changed appearance when the appearance of the character changes. Note that, in order to enable the update and deletion of the display element information, the full mode program FP may add identification information for identifying the display element information itself or a type thereof when outputting the display element information. In this case, the display element information acquisition section 24 stores each piece of the display element information along with identification information added to the display element information in the storage unit 12. As a result, when a full mode program FP updates or deletes display element information stored in the storage unit 12, the full mode program FP can update or delete the specific display element information by specifying the identification information.

Note that, a program board B may include display elements having contents common to program boards B corresponding to other full mode programs FP as well as information unique to a full mode program FP corresponding to the program board B. For example, the display element information acquisition section 24 acquires display element information delivered from a predetermined common content delivery server, and provides the board image display control section 22 with the acquired display element information along with other display element information.

Moreover, the board image display control section 22 may change a display element displayed in each of spaces arranged in a program board B at a predetermined timing during display of a program-related image Ip. Depending on a content provided by a content delivery server or a progress state of processing by a full mode program FP, the display element information acquisition section 24 may acquire more display elements than display elements which can be displayed in the program board B. In this case, for example, the board image display control section 22 arranges display elements randomly selected from candidates of the plurality of display elements in the program board B, and switches the display elements arranged in the program board B each time a certain period elapses. In this way, by displaying a program related image IP for a period exceeding a certain period, the user can browse more display elements than display elements which can be arranged in the program board B.

Further, when the display elements arranged in the program board B are changed, information on the current time and date is acquired at a timing of the change, and it is determined whether or not the acquired time and date satisfies a condition on a display start time and a display end time associated with display element information. As a result, for example, if a display element which has once become a display subject exceeds its display end time while display of a program-related image Ip continues, a state in which the display element exceeding the display end time remains displayed can be avoided by deleting the display element from the program-related image Ip at an update timing of display elements.

Moreover, attribute information indicating a display position and a display form of the display element represented by the display element information may be associated with the display element information acquired by the display element information acquisition section 24 in addition to the information indicating the display time. For example, if attribute information specifying a predetermined display position (any one of spaces in a template) is associated with the display element information, the board image display control section 22 arranges the display element at the specified display position in the program board B. Moreover, the attribute information indicating the display form may include information for specifying a font and a character size of text data. Further, information indicating a content of processing to be carried out when a user operates a display element represented by display element information may be associated with the display element information. For example, the information indicating the content of the processing is information (such as a URL) representing a destination of acquisition of information to be displayed when the user determines the display element as a subject of operation. In this example, when the user taps the display element, the board image display control section 22 displays information acquired by referring to information on acquisition destination associated with the display element.

The image switching section 25 switches a display image among a plurality of board images Ib previously displayed by the board image display control section 22 according to the selection operation of the user. For example, when the user first selects an application program AP1 in a state in which a menu image Im is displayed, the board image display control section 22 displays a board image Ib1 corresponding to the application program AP1 on the screen S. In this state, the user can display the menu image Im again by carrying out the image switching operation. Further, when the user selects another application program AP2 in a state in which the menu image Im is displayed again, the board image display control section 22 displays a board image Ib2 corresponding to the application program AP2. In this way, the user can successively display a plurality of board images Ib corresponding to a plurality of application programs AP in the board display region Ab of the screen S. The image switching section 25 regards the plurality of board images Ib displayed in the past and the menu image Im as the subjects of the switching processing, and switches the image to be displayed in the board display region Ab when the user carries out the image switching operation. Note that, in the following, the plurality of board images Ib and the menu image Im subject to the image switching processing are generally referred to as switching subject images.

According to this embodiment, the image switching operation is a slide operation in the left/right direction (X axis direction) with respect to the touch sensor 15. In other words, while any one of the switching subject images is displayed on the board display region Ab of the screen S, the user can display another switching subject image in the board display region Ab by carrying out the slide operation toward any one of the left and right directions. Which switching subject image out of the plurality of the switching subject images is to be displayed when the image switching operation is carried out may be determined, for example, depending on a past sequence of display of the switching subject images.

Particularly according to this embodiment, when the user carries out the image switching operation, the image switching section 25 displays a process of the switching of the display image in the board display region Ab. As a specific example, a description is now given of a display content for a case where a board image Ib1 is switched to a board image Ib2 by the user carrying out the slide operation toward the negative X-axis direction. First, when the user touches the touch sensor 15 by the finger and starts the slide operation in a state in which the board image Ib1 is displayed, the image switching section 25 displays a state of a movement of the board image Ib1 in the direction (negative X-axis direction) toward which the user moves the finger depending on a travel distance of the finger of the user. Simultaneously therewith, the image switching section 25 displays a state of the board image Ib2 entering the screen S following the moving board image Ib1 from the right side of the screen when viewed from the front (the positive direction side of the X axis). In other words, during the image switching operation, respective parts of the board images Ib1 and Ib2 arranged in the instructed direction of the image switching operation are displayed in the board display region Ab. Then, when the user slides the finger over a predetermined distance or longer, and detaches the finger from the touch sensor 15, thereby finishing the image switching operation, the image switching section 25 further moves the board images Ib1 and Ib2 until the entire board image Ib2 moves in the board display region Ab. As a result, the image switching processing completes, and the state in which only the board image Ib2 is displayed in the board display region Ab is brought about.

Figure 8:
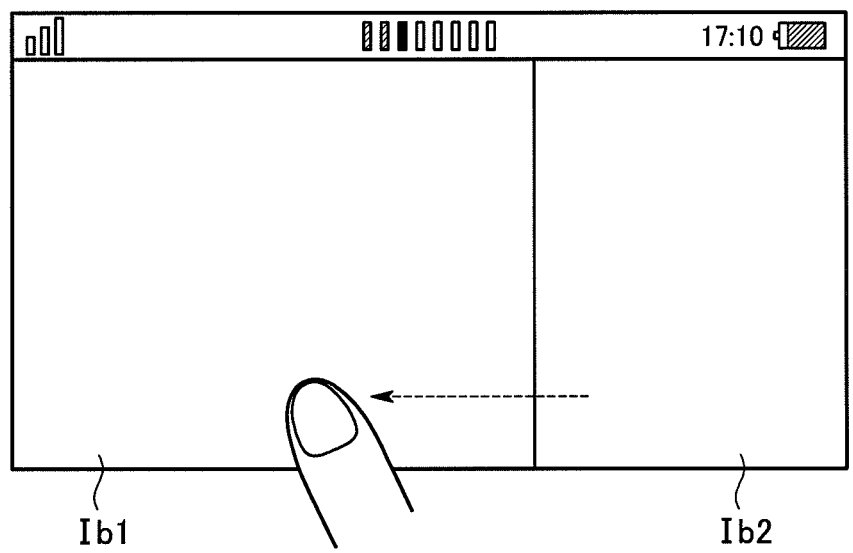
FIG. 8 A diagram illustrating an example of an image displayed on the screen while image switching processing is being carried out.
Figure 9:
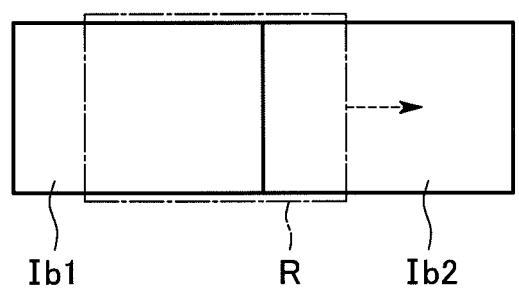
FIG. 9 A diagram illustrating a method of generating the image displayed on the screen while the image switching processing is being carried out.

FIG. 8 is a diagram illustrating an example of an image displayed on the screen S while the image switching processing is being carried out. In FIG. 8, the dashed arrow indicates a process of the movement of the finger of the user. Moreover, FIG. 9 is a diagram conceptually illustrating a method of generating an image displayed on the screen S while the image switching processing is being carried out. In FIG. 9, a rectangle in an alternate long and short dash line indicates a display target range R displayed in the board display region Ab, and the dashed arrow indicates a movement direction of the display target range R during the execution of the image switching processing. As illustrated in FIG. 9, in an image in which the board image Ib1 displayed before switching and the board image Ib2 to be displayed after the switching are arranged side by side, a range including a boarder portion of the board image Ib1 and the board image Ib2 is subject to display on the screen S during the image switching processing.

A description is now given of the image switching processing for a case where the board image Ib1 displayed before the switching is a program output image Io1 rendered by a light program LP1, and the board image Ib2 displayed after the switching is a program output image Io2 rendered by a light program LP2. According to this embodiment, a light program LP once activated is, even if the program output image Io is not actually displayed on the screen S, still in the state of being executed by the application program execution section 23 while the program output image Io output by itself remains the switching subject image. However, while the program output image Io is not displayed on the screen S, the light program LP only needs to be executed on the background and the rendering processing for the program output image Io is not necessary. Then, according to this embodiment, a plurality of board images Ib are not simultaneously displayed in the board display region Ab except for the period in which the image switching processing is being carried out. As a result, if both the program output images Io1 and Io2 are switching subject images, though both the light programs LP1 and LP2 are being executed, usually, only the light program LP1 carries out the rendering processing when the program output image Io1 is displayed in the board display region Ab, and only the light program LP2 carries out the rendering processing when the program output image Io2 is being displayed.

Based on the above-mentioned configuration, each light program LP does not always assume that other programs LP are simultaneously carrying out the rendering processing while the light program LP is carrying out the rendering processing. Therefore, if a plurality of light programs LP simultaneously carry out the rendering processing for program output images Io, a processing load on a CPU or a GPU temporarily increases, and a problem of delay in the rendering processing may occur. However, as described above, two program output images Io are simultaneously displayed in the board display region Ab during the execution of the image switching processing.

In order to avoid this problem, for example, it is conceivable that the image switching section 25 temporarily stores still image data of the switching subject image displayed immediately before in the storage unit 12 for each of switching subject images which are not currently displayed on the board display region Ab, and displays the process of the image switching by using the still image data when the image switching operation is carried out. By using this method, in the course of the image switching, the state in which a plurality of light programs LP simultaneously carry out the rendering processing can be avoided. However, the still image data is recorded when a corresponding program output image Io is displayed last time, and it is highly possible that the program output image Io to be displayed again may be different from the stored image as the still image data as a result of the execution of the processing by the light program LP on the background thereafter. Then, immediately after a light program LP subject to the display starts again the rendering processing after the image switching processing, a program output image Io which has greatly changed from the still image data which was displayed during the image switching may be displayed, which causes the user to feel sense of discomfort.

Therefore, according to this embodiment, when a plurality of program output images Io, which are acquired as a result of the rendering processing carried out independently by a plurality of light programs LP, are simultaneously displayed on the screen S, the rendering timing control section 26 adjusts the rendering timing of the program output images Io in order to restrain the processing load.

The rendering timing control section 26 determines a timing at which an application program AP for rendering a program output image Io to be displayed on the screen S carries out the rendering processing. Then, the rendering timing control section 26 outputs a rendering instruction for instructing the determined timing to the application program AP so that the application program AP carries out the rendering processing at the timing. If there is only one program output image Io to be displayed on the screen S, the rendering timing control section 26 may output, to an application program AP for rendering the program output image Io, the rendering instruction at a predetermined frequency (for example, a frequency of 60 times per second) so that the application program AP carries out the rendering processing simply at the predetermined frequency. The application program AP carries out the rendering processing for the program output image Io at a predetermined interval according to the rendering instruction. The program output image Io obtained as a result of the rendering processing is written to a frame buffer of the image processing unit 13, and is displayed on the screen S. Therefore, the frequency of the rendering instruction output by the rendering timing control section 26 usually coincides with an update frequency (frame rate) of the display of the screen S. In the following, the frequency for outputting the rendering instruction by the rendering timing control section 26 when the number of program output images Io to be displayed on the screen S is one is denoted by reference frequency fr.

On the other hand, if a plurality of program output images Io rendered by a plurality of light programs LP are simultaneously displayed on the screen S, the rendering timing control section 26 provides at least one of the plurality of light programs LP with a rendering instruction at a frequency lower than the reference frequency fr for the case where the number of program output images Io to be displayed is one. In other words, for at least one of the plurality of light programs LP, the rendering instruction is provided at a time interval longer than a time interval for providing the rendering instruction at the reference frequency fr. As a specific example, the rendering timing control section 26 reduces the frequency of the rendering instruction provided for each of the light programs LP to below the reference frequency fr so that a total number of times of the rendering processing carried out by the plurality of light programs LP in a predetermined period does not exceed the reference frequency fr. Further, the rendering timing control section 26 outputs the rendering instruction to only one light program LP at a time in order to prevent the plurality of light programs LP from simultaneously carrying out the rendering processing. As a result, even if a plurality of light programs LP carry out the rendering processing, the execution timings of the rendering processing will not overlap one another. Further, the rendering timing control section 26 may repeatedly provide a plurality of light programs LP with the rendering instruction one at a time in a predetermined order. As a result, each of the light programs LP can carry out the rendering processing at a certain cycle, which is the same as those of the other light programs LP.

As an example, when the image switching section 25 is carrying out the image switching processing from the program output image Io1 rendered by the light program LP1 to the program output image Io2 rendered by the light program LP2, the rendering timing control section 26 alternately outputs the rendering instruction to each of the light programs LP1 and LP2 at a frequency which is a half of the reference frequency fr. FIG. 10 is a diagram illustrating the execution timing of the rendering processing for the program output images Io1 and Io2 based on the instruction by the rendering timing control section 26. In the example in this figure, the reference frequency fr is 60 times/second, and a time t is an elapsed time, t=0 corresponds to a start time point of the image switching processing, and t=n corresponds to an end time point of the image switching processing. Moreover, rectangles in the figure represent the execution timings of the rendering processing for the respective light programs LP1 and LP2 based on the rendering instructions by the rendering timing control section 26. In the example of this figure, the rendering timing control section 26 provides the light program LP1 with the rendering instruction once in $1/60$ second, and until the image switching processing starts, and provides each of the light programs LP1 and LP2 with the rendering instruction once in $1/30$ second and alternately after the start of the image switching processing. Moreover, the rendering timing control section 26 provides the light program LP2 with the rendering instruction once in $1/60$ second after the end of the image switching processing. As a result of this control, there can be provided a configuration in which the frequency of the rendering processing carried out by light programs LP does not exceed the reference frequency fr for the information processing apparatus 10 as a whole, irrespective of whether the image switching processing is being carried out or not, and, only any one of the light programs LP carries out the rendering processing at any time point. As a result, an increase in the processing load caused by overlapping rendering processing can be avoided.

On this occasion, according to this embodiment, the update itself of the image displayed on the screen S is carried out at a frame rate corresponding to the reference frequency fr. As a result, while a plurality of program output images Io are simultaneously displayed on the screen S, writing to a frame buffer memory needs to be carried out for each of the program output images Io at the reference frequency fr. However, while the plurality of program output images Io are simultaneously displayed on the screen S, the frequency of the rendering processing itself by each of the light programs LP is lower than the reference frequency fr as described above. Thus, a program output image Io to be written in the frame buffer memory at a timing when the light program LP is not carrying out the rendering processing is a program output image Io generated immediately before by the light program LP.

As a specific example, in FIG. 10, a program output image Io1 (0) is generated at t=0 as a result of the light program LP1 carrying out the rendering processing. The light program LP1 does not directly write the program output image Io1 (0) in the frame buffer memory, but writes the program output image Io1 (0) in a memory region M1 reserved in the storage unit 12. The image switching section 25 copies the program output image Io1 (0) to a region of the frame buffer memory corresponding to the board display region Ab, and writes an image to be displayed in the status bar display region As in a region of the frame buffer memory corresponding to the status bar display region As. As a result, the display image of the screen S is updated. Then, only the light program LP2 carries out the rendering processing at a time point of t=$1/60$ second, and writes a program output image Io2 (1) generated as a result thereof in a memory region M2 of the storage unit 12 that is different from the memory region M1. Then, the image switching section 25 clips a part of the program output image Io1 (0) written in the memory region M1 and writes the clipped part to the frame buffer memory, and clips a part of the program output image Io2 (1) written in the memory region M2 and writes the clipped part to the frame buffer memory. As a result, the image displayed on the screen S is updated to an image including both the program output images Io1 and Io2. Further, at a time point of t=$2/60$ seconds, the light program LP1 generates a program output image Io1 (2) and writes the program output image Io1 (2) in the memory region M1, and the image switching section 25 updates the image displayed on the screen S by writing a part of the program output image Io1 (2) written in the memory region M1 and a part of the program output image Io2 (1) stored in the memory region M2 in the frame buffer memory. Though each of the light programs LP carries out the rendering processing at a frequency lower than the reference frequency fr, the information processing apparatus 10 may update the image including the plurality of program output images Io and display the updated image on the screen S at the reference frequency fr by repeating the above-mentioned processing.

Note that, in the above description, the rendering timing control section 26 reduces the frequency of the rendering instruction directed to each of the light programs LP when the image switching processing is carried out among the program output images Io rendered by the plurality of light programs LP. However, the embodiment of the present invention is not limited thereto, and the rendering timing control section 26 may carry out similar control also when the image switching processing is carried out between the program output image Io rendered by the light program LP and the program related image Ip generated by the board image display control section 22. Moreover, in this case, it is assumed that the processing load of the rendering processing for the program output image Io is relatively high compared with that of the rendering processing for the program-related image Ip. Therefore, the rendering timing control section 26 may not change the frequency of the rendering processing for the program-related image Ip (namely the frequency at which the rendering timing control section 26 instructs the board image display control section 22 to carry out the rendering processing for the program-related image Ip) from the reference frequency fr, and may reduce only the frequency of the rendering instruction for the program output image Io directed to the light program LP. According to this control, though the board image display control section 22 also carries out the rendering processing for the program-related image Ip at a timing when the light program LP carries out the rendering processing for the program output image Io, the processing load can be reduced in a long-term perspective compared with the case where the frequency of the rendering instruction directed to the light program LP is not reduced. Particularly in this case, the board image display control section 22 may write only a portion to be displayed on the screen S out of the program-related image Ip directly into the frame buffer.

The embodiment of the present invention is not limited to that described above. For example, the information processing apparatus 10 may include a touch sensor on a rear surface side (rear side of a surface on which the screen S is disposed) of a housing of the information processing apparatus 10 in place of or in addition to the touch sensor 15 arranged over the screen S. In this case, the touch sensor on the rear surface side also has a detection surface corresponding to the screen S, and the user can carry out the scroll instruction and the image switching instruction by carrying out the slide operation in which the user moves a finger or the like on the touch sensor.

Moreover, though the user carries out the selection operation for the menu item image Ic and the image switching operation by using the touch sensor in the above-mentioned description, the user may instruct the direction to the information processing apparatus 10 by using other various operation devices.

Moreover, the adjustment of the rendering timing by the rendering timing control section 26 may be carried not only for the image switching processing but also for various situations in which a plurality of programs carry out the rendering processing for an image independently of one another, and display simultaneously a resulting plurality of images on the screen. For example, if n program output images Io obtained by n programs carrying out rendering processing independently of one another are simultaneously displayed on the screen, the rendering timing control section 26 may reduce the frequency of the rendering instruction directed to each of the programs to 1/n of the reference frequency fr, and may output the rendering instruction to each of the programs sequentially one at a time.

The invention claimed is:

1. An information processing apparatus, comprising:
   display element information acquisition means for acquiring display element information output by an application program during an execution of the application program, and storing the display element information in a storage unit; and
   program-related image display control means for generating an image including a display element represented by the display element information stored in the storage unit as a program-related image for presenting information relating to the application program, and controlling a display unit to display the generated image during a period in which the application program is not executed,
   wherein the display element information acquisition means acquires, along with the display element information, information indicating a display time of the display element information output by the application program; and
   wherein the program-related image display control means controls a display timing of the display element represented by the display element information by using the information indicating the display time,
   wherein the application program is an application program of a first type; and
   the information processing apparatus further comprises:
      menu image display control means for controlling the display unit to display a menu image including both a menu item image associated with the application program of the first type and a menu item image associated with an application program of a second type which is different from the first type;
      wherein, when a user selects the menu item image associated with the application program of the first type in a state in which the menu item is displayed, the program-related image display control means generates a program-related image for presenting information relating to the application program of the first type, and display of the image output by the application program of the first type occurs after the user carries out a predetermined activation instruction operation while the program-related image is displayed; and
      wherein, when a user selects the menu item image associated with the application program of the second type in a state in which the menu item is displayed, display of an image output by the application program of the second type occurs.

2. The information processing apparatus according to claim 1, wherein:
   the application program is a program for executing predetermined processing at a predetermined processing execution time; and
   the display element information acquisition means acquires, along with the display element information relating to the predetermined processing, information indicating a display time determined depending on the predetermined processing execution time.

3. The information processing apparatus according to claim 1, wherein:
   the information indicating the display time includes information indicating a display start time for the display element; and
   the program-related image display control means restricts the display of the program-related image including the display element when the display timing of the program-related image is before the display start time, and displays the program-related image including the display element when the display timing is after the display start time.

4. The information processing apparatus according to claim 1, wherein:
   the information indicating the display time includes information indicating a display end time for the display element; and
   the program-related image display control means displays the program-related image including the display element when the display timing of the program-related image is before the display end time, and restricts the display of the program-related image including the display element when the display timing is after the display end time.

5. The information processing apparatus according to claim 1, wherein the display element information acquisition means deletes the display element information stored in the storage unit in response to an instruction by the application program.

6. The information processing apparatus according to claim 1, wherein the display element information acquisition means updates the display element information stored in the storage unit to display element information newly output by the application program in response to an instruction by the application program.

7. An information processing method executed by a computer, comprising the steps of:
   acquiring display element information output by an application program during an execution of the application program and a display time of the display element, and storing the display element information and the display time in a storage unit;
   displaying an image, on a display, including a display element represented by the display element information stored in the storage unit as a program-related image for presenting information relating to the application program at the display time during a period in which the application program is not executed, wherein the application program is an application program of a first type; and controlling the display unit to display a menu image including both a menu item image associated with the application program of the first type and a menu item image associated with an application program of a second type which is different from the first type;

wherein, when a user selects the menu item image associated with the application program of the first type in a state in which the menu item is displayed, a program-related image is generated for presenting information relating to the application program of the first type, and display of the image output by the application program of the first type occurs after the user carries out a predetermined activation instruction operation while the program-related image is displayed; and wherein, when a user selects the menu item image associated with the application program of the second type in a state in which the menu item is displayed, display of an image output by the application program of the second type occurs.

8. A non-transitory computer readable information storage medium having recorded thereon a program for causing a computer to function as:

display element information acquisition means for acquiring display element information output by an application program during an execution of the application program, and storing the display element information in a storage unit; and program-related image display control means for generating an image including a display element represented by the display element information stored in the storage unit as a program-related image for presenting information relating to the application program, and controlling a display unit to display the generate image during a period in which the application program is not executed, wherein the display element information acquisition means acquires, along with the display element information, information indicating a display time of the display element information output by the application program; and wherein the program-related image display control means controls a display timing of the display element represented by the display element information by using the information indicating the display time, wherein the application program is an application program of a first type; and the information processing apparatus further comprises:

menu image display control means for controlling the display unit to display a menu image including both a menu item image associated with the application program of the first type and a menu item image associated with an application program of a second type which is different from the first type;

wherein, when a user selects the menu item image associated with the application program of the first type in a state in which the menu item is displayed, the program-related image display control means generates a program-related image for presenting information relating to the application program of the first type, and display of the image output by the application program of the first type occurs after the user carries out a predetermined activation instruction operation while the program-related image is displayed; and wherein, when a user selects the menu item image associated with the application program of the second type in a state in which the menu item is displayed, display of an image output by the application program of the second type occurs.

* * * * *